(12) United States Patent
Wei et al.

(10) Patent No.: US 12,245,546 B2
(45) Date of Patent: Mar. 11, 2025

(54) ROBOTIC LAWN MOWER

(71) Applicant: SHENZHEN MAMMOTION INNOVATION CO., LIMITED, Shenzhen (CN)

(72) Inventors: Jidong Wei, Shenzhen (CN); Kai Wang, Shenzhen (CN)

(73) Assignee: SHENZHEN MAMMOTION INNOVATION CO., LIMITED, Shenzhen (CN)

( * ) Notice: Subject to any disclaimer, the term of this patent is extended or adjusted under 35 U.S.C. 154(b) by 0 days.

(21) Appl. No.: 18/458,475

(22) Filed: Aug. 30, 2023

(65) Prior Publication Data
US 2024/0324497 A1    Oct. 3, 2024

Related U.S. Application Data

(63) Continuation of application No. PCT/CN2023/085150, filed on Mar. 30, 2023.

(51) Int. Cl.
*A01D 34/00* (2006.01)
*A01D 101/00* (2006.01)

(52) U.S. Cl.
CPC ........ *A01D 34/008* (2013.01); *A01D 2101/00* (2013.01)

(58) Field of Classification Search
CPC .......................... A01D 34/008; A01D 2101/00
USPC ............................................ 180/6.5; 56/10.2
See application file for complete search history.

(56) References Cited

U.S. PATENT DOCUMENTS

2019/0299398 A1    10/2019  Svensson
2024/0147898 A1*   5/2024  Holgersson ............ A01D 34/84

FOREIGN PATENT DOCUMENTS

| CN | 3167246 A1 * | 8/2021 | ........... A01D 34/008 |
| CA | 112470678 A | 3/2021 |
| CN | 218499589 U | 2/2023 |
| CN | 218702514 U | 3/2023 |

(Continued)

OTHER PUBLICATIONS

PCT/CN2023/085150, Transmission of International Search Reports and Written Opinions or Notices from International Search Units, Oct. 18, 2023, 3 pages.(with English translation).

(Continued)

*Primary Examiner* — Anne Marie M Boehler
*Assistant Examiner* — Felicia L. Brittman-Alabi
(74) *Attorney, Agent, or Firm* — Getech Law LLC; Jun Ye

(57) ABSTRACT

A robotic lawn mower comprises a frame, a first wheel set, and a second wheel set, wherein the first wheel set and the second wheel set are respectively arranged at opposite rear and front ends of the frame, the first wheel set is equipped with driving wheels, and the second wheel set is equipped with omni-directional wheels. The robotic lawn mower further comprises a controller, a first driving module, and a second driving module, wherein the controller is connected to each of the driving modules, the controller controls the first driving module to drive the first wheel set to move so as to provide main power to the robotic lawn mower, and the controller further controls the second driving module to drive the second wheel set to rotate so as to provide auxiliary power for overcoming a resistance generated by the ground when the second wheel set rotates.

10 Claims, 10 Drawing Sheets

(56) References Cited

FOREIGN PATENT DOCUMENTS

WO      2016109860 A2      7/2016
WO      2021004484 A1      1/2021

OTHER PUBLICATIONS

PCT/CN2023/085150, International Search Report, Oct. 19, 2023, 10 pages. (with English translation).
PCT/CN2023/085150, Written Opinion, Oct. 18, 2023, 7 pages. (with English translation).

* cited by examiner

ROBOTIC LAWN MOWER

CROSS-REFERENCE TO RELATED APPLICATION

This application is a continuation of Application No. PCT/CN2023/085150, filed Mar. 30, 2023, the content of which application is hereby expressly incorporated herein by reference in its entirety.

TECHNICAL FIELD

The present application relates to the field of robotics, and in particular to a robotic lawn mower.

BACKGROUND ART

In existing robotic lawn mowers, rear wheels acts as driving wheels, front wheels acts driven wheels, and on-site rotation relies on the fact that the rear wheels apply driving and the front wheels are driven. However, because a large wheelbase between the front wheels and the rear wheels of the robotic lawn mower, a distance between the front wheels and the instantaneous center of the velocity of rotation of the rear wheels is large (a long arm of force), such that the rear wheels may need to be provided with a large moment in order to achieve on-site rotation. Moreover, when the robotic lawn mower actually travels on a lawn, due to large height and significantly different morphologies of grass, a friction force between the front wheels and the rear wheels of the robotic lawn mower and the lawn is greater than a friction force between the wheels and common hardened ground. Especially, a rotation resistance to the front wheels close to an inner side is larger during turning, so slippage is likely to occur. In the case of on-site rotational slippage of the front wheels close to the inner side during turning, a sliding friction force is significantly greater than the rolling friction during normal rolling, in this case, the rear driving wheels may need to be provided with a larger moment in order to achieve turning. Due to an increased moment for the rear wheels, the rear wheels seriously wear grass, resulting in poor use experience.

SUMMARY

In view of the above, the present application provides a robotic lawn mower to solve the technical problem of serious lawn wear during rotation of the robotic lawn mower.

The present application provides a robotic lawn mower, including a frame, a first wheel set, and a second wheel set, wherein the first wheel set and the second wheel set are respectively arranged at opposite rear and front ends of the frame, the first wheel set is equipped with driving wheels, and the second wheel set is equipped with omni-directional wheels. The robotic lawn mower further includes a controller, a first driving module, and a second driving module, wherein the controller is connected to each of the first driving module and the second driving module, the controller controls the first driving module to drive the first wheel set to move so as to provide main power to the robotic lawn mower, and the controller further controls the second driving module to drive the second wheel set to rotate so as to provide auxiliary power for overcoming a resistance between the second wheel set and the ground that needs to be overcome when the second wheel set rotates relative to the ground.

Due to a large wheelbase between the first wheel set and the second wheel set of the robotic lawn mower, when only the first wheel set is driven by the first driving module to rotate so as to provide rotating power for the robotic lawn mower, a distance between the second wheel set and the instantaneous center of the velocity of rotation of the first wheel set is large (a long arm of force), such that the first wheel set needs to be provided with a large moment by the first driving module in order to achieve on-site rotation, and the first wheel set severely damages a lawn and may directly wear the lawn away, especially at a place with a large turning resistance. Furthermore, when the rotating resistance is large, auxiliary wheels of the second wheel set may be switched from rolling to sliding, which further increases a friction force between the second wheel set and the ground. In the present application, the first driving module provides main power for the robotic lawn mower and may drive the robotic lawn mower to advance, turn or move back, and the second driving module drives the second wheel set to rotate so as to provide auxiliary power for overcoming the resistance generated between the second wheel set and the ground that needs to be overcome when the second wheel set rotates relative to the ground, such that when the auxiliary wheels of the second wheel set are switched from lateral sliding to lateral rolling during the turning, a friction force between the auxiliary wheels of the second wheel set and the ground may be significantly reduced. Also, during the rotating of the second wheel set, different auxiliary wheels come into contact with the ground at different moments, such that the degree of grass wear may be reduced. Practically, damages to a lawn can be reduced by driving the first wheel set to move just with the moment during normal travel, because it is unnecessary for the first driving module to increase the moment for the first wheel set for turning or on-site rotation. Since the first driving module does not increase the moment during turning or on-site rotation, increased damages to the lawn due to an increased moment are prevented, which may significantly reduces lawn wear.

BRIEF DESCRIPTION OF THE DRAWINGS

In order to more clearly describe the technical solutions in the embodiments of the present application or the prior art, the drawings necessary for describing the embodiments or the prior art will be briefly described below. Apparently, the drawings in the description below merely show some of the embodiments of the present application, and those of ordinary skill in the art would have obtained other drawings from these drawings without involving any inventive effort.

DETAILED DESCRIPTION OF EMBODIMENTS a schematic stress diagram In the description of the present specification, the description with reference to the terms such as "an embodiment", "a specific embodiment" and "an example" means that specific features, structures, materials or characteristics described with respect to this embodiment or example are comprised in at least one embodiment or example of the present application. In this specification, the schematic expressions of the above terms do not necessarily refer to the same embodiments or examples. Furthermore, the specific features, structures, materials, or characteristics described may be combined in a suitable manner in any one or more embodiments or examples.

Figure 1:
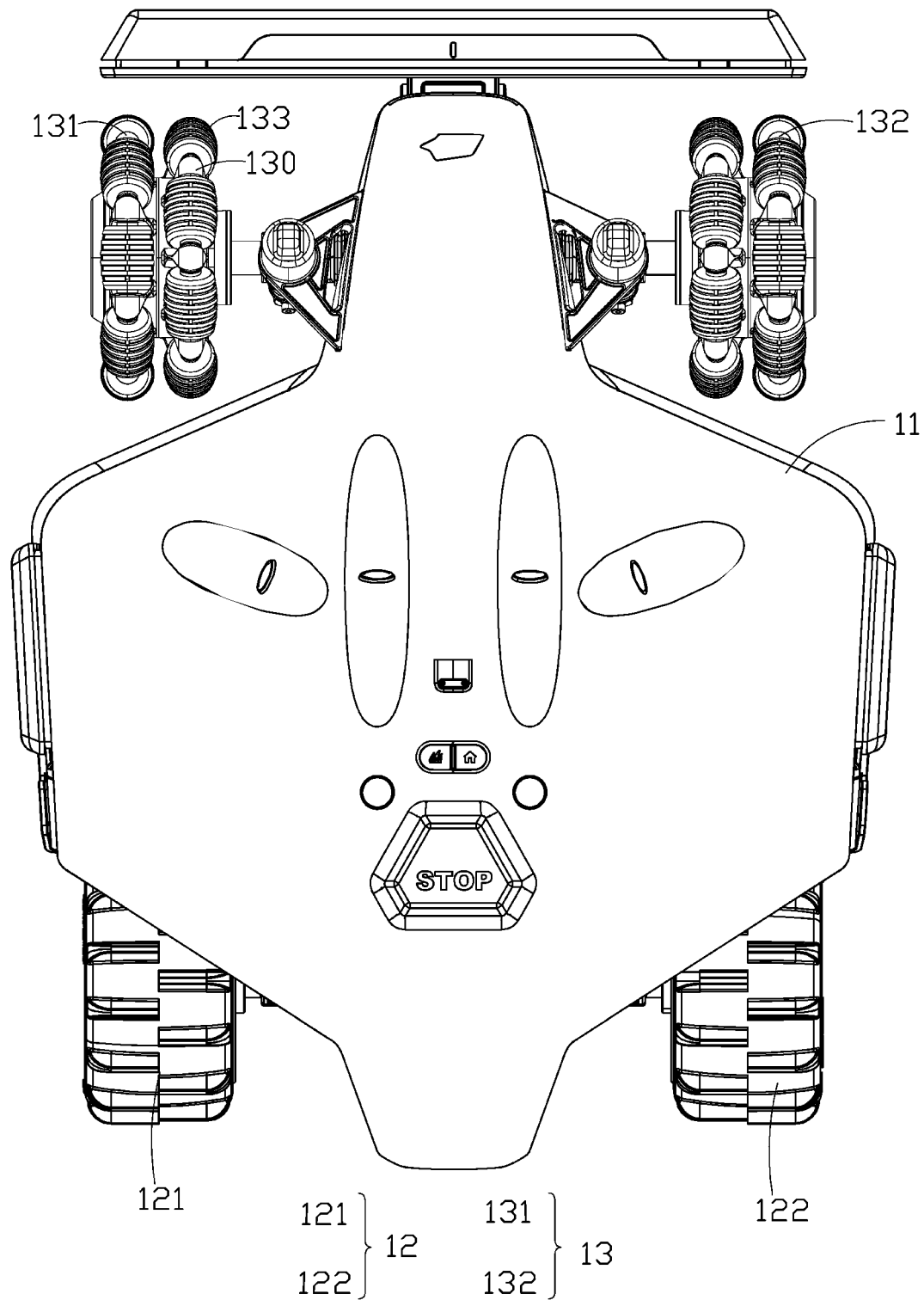
FIG. 1 is a schematic perspective structural diagram of a robotic lawn mower according to a first embodiment of the present application.
Figure 2:
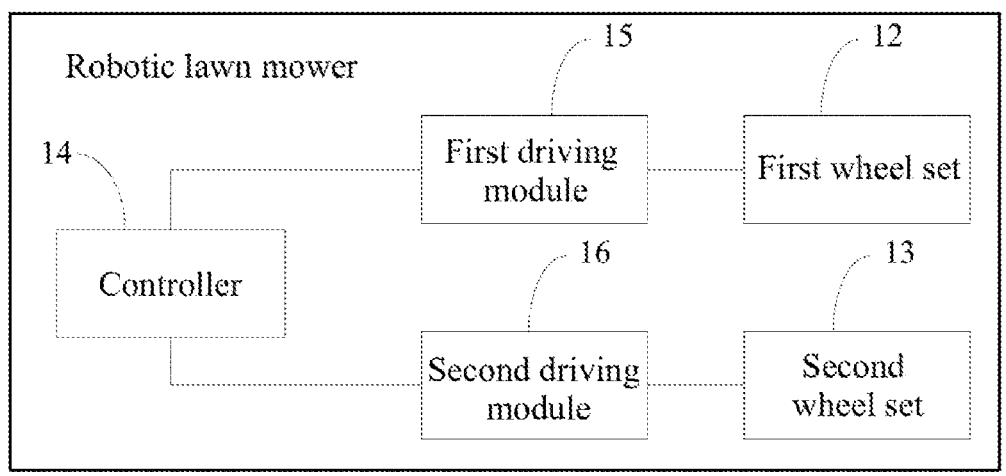
FIG. 2 is a schematic modular diagram of a robotic lawn mower according to an embodiment of the present application.

Referring to FIGS. 1 and 2 together, FIG. 1 is a schematic perspective structural diagram of a robotic lawn mower according to a first embodiment of the present application; FIG. 2 is a schematic modular diagram of a robotic lawn mower according to an embodiment of the present application. The robotic lawn mower 1 includes a frame 11, a first wheel set 12, and a second wheel set 13. The frame 11 is of a structure with a wide middle and narrow front and rear ends. The first wheel set 12 and the second wheel set 13 are respectively arranged at the opposite front and rear ends of the frame 11. The first wheel set 12 is equipped with driving wheels, and the second wheel set 13 is equipped with omni-directional wheels. The robotic lawn mower 1 further includes a controller 14, a first driving module 15, and a second driving module 16. The controller 14 is connected to each of the first driving module 15 and the second driving module 16. The controller 14 controls the first driving module 15 to drive the first wheel set 12 to move so as to provide main power to the robotic lawn mower 1, and the controller 14 further controls the second driving module 16 to drive the second wheel set 13 to rotate relative to the ground so as to provide auxiliary power for overcoming a resistance generated by the ground when the second wheel set 13 rotates relative to the ground.

The driving wheels are conventional rubber tires with only one degree of freedom, that is, rotating around a center line of an axle.

The omni-directional wheels are tires with at least two degrees of freedom. Compared with the conventional rubber tires with only one degree of freedom, the added degree of freedom of the omni-directional wheels is located on a tire tread, that is, a rotation may be generated by means of contact with the ground, and a certain included angle is formed between a rotating plane and the rotating plane for the conventional rubber tire with only one degree of freedom. The omni-directional wheels may be, but are not limited to, continuous switching wheels or Mecanum wheels. Referring to FIG. 1, in this embodiment, the omni-directional wheels are continuous switching wheels and each comprise a hub 130 and a plurality of auxiliary wheels 133, and the plurality of auxiliary wheels 133 are strung on the hub 130 at intervals. When the omni-directional wheels travel forward, the hub 130 rotates about a central axis of the omni-directional wheel, and the hub 130 drives the auxiliary wheels 133 to wholly rotate about the central axis of the omni-directional wheel. When the omni-directional wheel makes a turn, the auxiliary wheels 133 can rotate relative to the hub 130 with the hub 130 as an axis of rotation. Therefore, the degree of freedom of the omni-directional wheel is increased relative to the driving wheel.

Due to a large wheelbase between the first wheel set 12 and the second wheel set 13 of the robotic lawn mower 1, when only the first wheel set 12 is driven by the first driving module 15 to rotate so as to provide movement power for the robotic lawn mower 1, a distance between the second wheel set 13 and the instantaneous center of the velocity of rotation of the first wheel set 12 is large (a long arm of force), such that the first wheel set 12 needs to be provided with a large moment by the first driving module 15 in order to achieve on-site rotation. Since the moment required for the first wheel set 12 is increased, the first wheel set 12 further damages a lawn accordingly and may directly wear the lawn away, especially on the ground with a large turning resistance. Furthermore, when the rotating resistance is large, the auxiliary wheels 133 of the second wheel set 13 may be switched from rolling to sliding, which further increases a friction force between the second wheel set 13 and the ground. In the present application, the first driving module 15 provides main power for the robotic lawn mower 1 and may drive the robotic lawn mower 1 to advance, turn or move back, and the second driving module 16 drives the second wheel set 13 to rotate relative to the ground so as to provide auxiliary power for overcoming the resistance between the second wheel set and the ground that needs to be overcome when the second wheel set 13 rotates relative to the ground, such that when the auxiliary wheels 133 of the second wheel set 13 are switched from lateral sliding to lateral rolling during the turning, a friction force between the auxiliary wheels 133 of the second wheel set 13 and the ground may be significantly reduced. Also, different auxiliary wheels 133 come into contact with the ground at different moments during the rotating of the second wheel set 13 relative to the ground, such that the fact that the same auxiliary wheel 133 still come into contact with the ground at different moments can be avoided, impurities such as grass cuttings or soil stuck between the auxiliary wheels 133 in contact with the ground may be tossed away during the rotation of the second wheel set 13, the problem of stuck impurities such as grass cuttings or soil between the auxiliary wheels 133 may be solved, different auxiliary wheels 133 may be switched to come into contact with the ground, the phenomenon of a certain auxiliary wheel 133 being unable to rotate and being dragged because the auxiliary wheel is stuck by the impurities may be avoided, and thus the degree of grass wear may be reduced. It is unnecessary for the first driving module 15 to increase the moment for the first wheel set 12 for turning or on-site rotation, and it is only required to drive the first wheel set 12 to move with the moment during normal travel. Since the first driving module 15 does not increase the moment during turning or on-site rotation, increased damages to the lawn due to an increased moment are prevented, which may significantly reduces lawn wear.

In some embodiments, the robotic lawn mower 1 is operated at a place with luxuriant grass, and when the height of the grass is greater than the diameter of the auxiliary wheels 133, the grass located on a trajectory of rotation directly acts, during turning or on-site rotation, on the hub to generate a rotating resistance, part of the grass higher than the auxiliary wheels 133 can be pulled to be lower than the auxiliary wheels 133 by means of a concave-convex structure on the hub by rotating the second wheel set 13, thereby reducing the rotating resistance.

Figure 3:
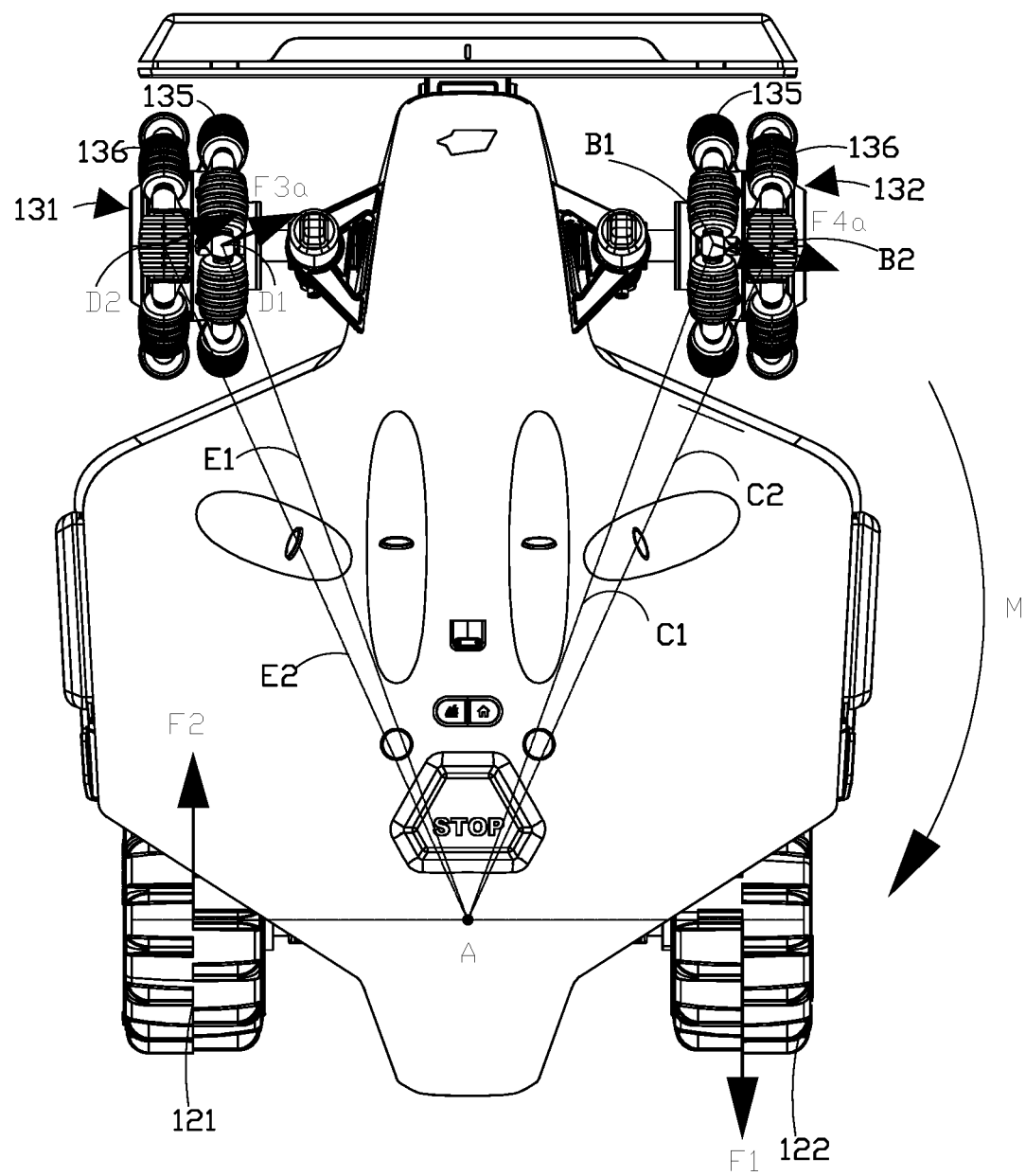
FIG. 3 is a schematic stress diagram of the robotic lawn mower according to the first embodiment of the present application during on-site clockwise rotation.

In some embodiments, referring to FIG. 3, when the robotic lawn mower 1 rotates on site, an instantaneous center of velocity A of the robotic lawn mower is proximate to a midpoint of a line connecting axle centers of the driving wheels in the first wheel set 12. The term "proximate to" means that the instantaneous center of velocity A does not always coincide with the midpoint of the connecting line between the axle centers of the first wheel set 12, and is within a preset range around the midpoint. A conventional robotic lawn mower has two velocity setting models, i.e., a two-wheel differential model and a four-wheel differential model, wherein the two-wheel differential model is different from the four-wheel differential model mainly in that the instantaneous center of velocity of the robotic lawn mower with the two-wheel differential model during rotation is proximate to a midpoint of a connecting line between axle centers of two driving wheels, and the instantaneous center of velocity of the robotic lawn mower with the four-wheel differential model is proximate to an intersection of intersecting lines connecting axle centers of four driving wheels during rotation. In the present application, although the robotic lawn mower 1 includes the second driving module 16, a two-wheel differential model is still provided, and the instantaneous center of velocity A of the robotic lawn mower during rotation is still proximate to the midpoint of the connecting line between the axle centers of the second wheel set 13, therefore there is a difference from a conventional four-wheel differential model. The front wheels and the rear wheels of the conventional robotic lawn mower 1 with the four-wheel differential model are all driving wheels and have the same respective constraints, the rotational degree of freedom of the driving wheels is not enough, and the whole mower is heavier, therefore the lawn wear is more serious. Since the two-wheel differential model is still used for the robotic lawn mower 1 of the present application, the defects of the four-wheel differential model are not present. Further, the second driving module 16 is provided for the robotic lawn mower 1 of the present application in addition to the conventional two-wheel differential model, and is configured for driving the second wheel set 13 to move so as to provide auxiliary power for overcoming the resistance between the second wheel set 13 and the ground that needs to be overcome when the second wheel set rotates relative to the ground. Therefore, the problem of the rear wheels of the robotic lawn mower with the conventional two-wheel differential model are likely to wear grass due to an increased moment is also overcome.

In some embodiments, a moment provided by the second driving module 16 is only required to overcome the resistance between the second wheel set 13 and the ground that needs to be overcome when the second wheel set rotates relative to the ground. Therefore, in fact, the moment provided to the second wheel set 13 by the second driving module 16 is less than the moment provided to the first wheel set 12 by the first driving module 15. Furthermore, during turning or on-site rotation, the second driving module 16 drives the second wheel set 13 to rotate relative to the ground, such that a friction force of the second wheel set 13 during turning can be reduced by switching from sliding friction to rolling friction. Compared with the traditional two-wheel differential model, with the same friction force between the lawn and the second wheel set 13, it is not required to additionally increase the moment of the first driving module 15 for driving the first wheel set 12 due to the large friction force between the lawn and the second wheel set 13, therefore the lawn wear caused by the first wheel set 12 during the turning is avoided.

In some embodiments, the moment provided to the second wheel set 13 by the second driving module 16 varies depending on the magnitude of the resistance between the second wheel set 13 and the ground that needs to be overcome when the second wheel set rotates relative to the ground. A driving force provided by the second driving module 16 to the second wheel set 13 is always greater than the resistance between the second wheel set 13 and the ground that needs to be overcome when the second wheel set rotates relative to the ground.

Therefore, since the grass growth vigor of the lawn varies in different regions, a travel resistance is large at a place with luxuriant grass, and when a lodging direction of the grass is the same as a travel direction, the travel resistance is relatively small. On the contrary, when the lodging direction is opposite to the travel direction, the travel resistance is greatly increased. Therefore, in the present application, the moment provided to the second wheel set 13 by the second driving module 16 varies depending on the magnitude of the resistance between the second wheel set 13 and the ground that needs to be overcome when the second wheel set 13 rotates relative to the ground, the moment provided to the second wheel set 13 by the second driving module 16 may be automatically adjusted based on the magnitude of the travel resistance, and the purpose of energy saving is achieved on the premise of meeting the turning requirement.

In some embodiments, when the robotic lawn mower 1 starts to operate, the controller 14 controls the second driving module 16 to be in continuous operation, but the moment provided to the second wheel set 13 by the second driving module 16 is variable, such that when the resistance between the second wheel set 13 and the ground that needs to be overcome when the second wheel set 13 rotates relative to the ground is very low, the moment provided to the second wheel set 13 by the second driving module 16 is also very small, and such that when the resistance between the second wheel set 13 and the ground that needs to be overcome when the second wheel set rotates relative to the ground is large, the moment provided to the second wheel set 13 by the second driving module 16 also increases accordingly.

In other embodiments, the controller 14 controls the second driving module 16 to start when the robotic lawn mower 1 makes a turn, and to enter a standby mode or be shut down when the robotic lawn mower 1 travels in a straight line, which further achieves the purpose of energy saving.

In some specific embodiments, the robotic lawn mower 1 includes an angle sensor (not shown) connected to the controller 14. The angle sensor, when sensing that the robotic lawn mower 1 makes a turn, generates a turning signal. The controller 14 controls, on the basis of the turning signal, the second driving module 16 to start so as to drive the second wheel set 13 to rotate. The angle sensor, when sensing that the robotic lawn mower 1 travels straightly, generates a straight travel signal. It may be understood that the term "straight travel" refers to a travel path having a turning radius greater than a preset threshold. The controller 14 controls, on the basis of the straight travel signal, the first driving module 15 to pause operating.

In some embodiments, a torque of the second driving module 16 is less than a torque of the first driving module 15, that is to say, the second driving module 16 is a low-torque motor. The second driving module 16 and the first driving module 15 may be, but are not limited to, a hub motor and a common motor in combination with a transmission system, etc., which are not limited herein. In this embodiment, both of the first driving module 15 and the second driving module 16 are hub motors.

Figure 4:
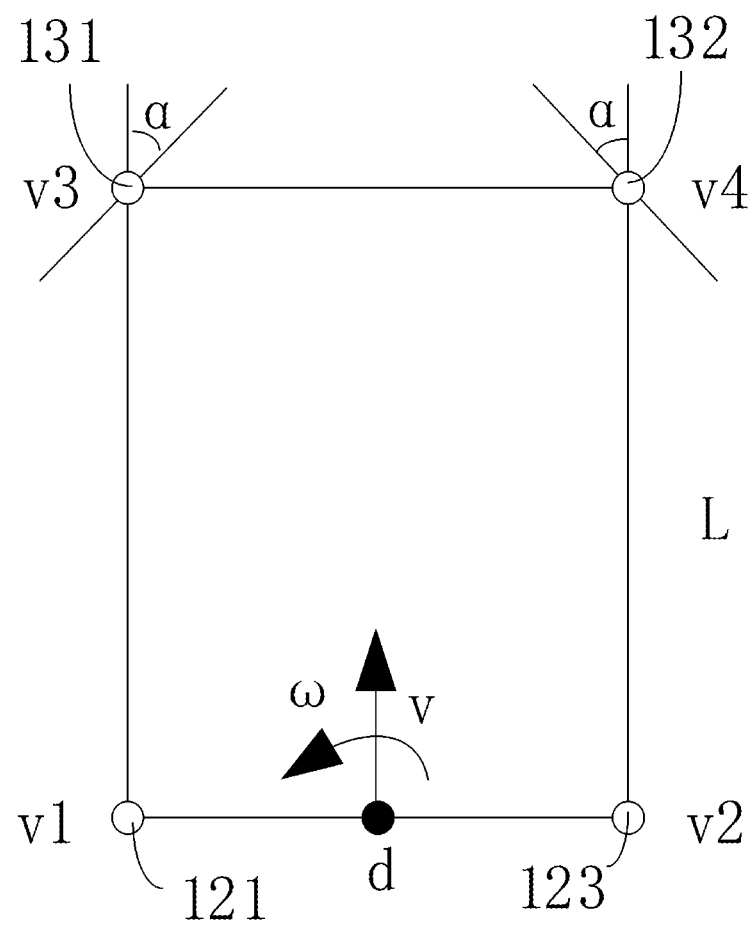
FIG. 4 is a schematic diagram showing the velocity setting of a robotic lawn mower according to an embodiment of the present application.

In some embodiments, referring again to FIG. 1, the first wheel set 12 includes a first left wheel 121 and a first right wheel 122. The first driving module 15 comprises a first left motor and a first right motor. The first left motor is configured for driving the first left wheel 121. The first right motor is configured for driving the first right wheel 122. The second wheel set 13 includes a second left wheel 131 and a second right wheel 132. The second driving module 16 includes a second left motor and a second right motor. The second left motor is configured for driving the second left wheel 131. The second right motor is configured for driving the second right wheel 132. The first left wheel 121, the second left wheel 131, the first right wheel 122 and the second right wheel 132 are separately controlled, and their respective velocity settings are controlled by the controller 14. During straight travel of the robotic lawn mower 1, the first left wheel 121, the second left wheel 131, the first right wheel 122 and the second right wheel 132 have the same velocity setting. Referring to FIG. 4, during on-site rotation of the robotic lawn mower 1, the velocity settings of the first left wheel 121, the first right wheel 122, the second left wheel 131 and the second right wheel 132 are respectively as follows:

The velocity setting of the first left wheel 121 is $$v1 = v - \omega\frac{d}{2};$$

the velocity setting of the first right wheel 122 is $$v2 = v + \omega\frac{d}{2};$$

the velocity setting of the second right wheel 132 is $$v4 = \left(v - \omega\frac{d}{2}\right)$$

cosα+ωLsinα; and
the velocity setting of the second left wheel 131 is $$v3 = \left(v + \omega\frac{d}{2}\right)$$

cosα−ωLsinα, wherein v is the travel velocity at the instantaneous center, w is the rotational angular velocity at the instantaneous center, L is the wheelbase between the first right wheel 122 and the second right wheel 132, or the wheelbase between the first left wheel 121 and the second left wheel 131, d is the wheelbase between the first left wheel 121 and the first right wheel 122, and a is the angle of inclination of the second left wheel 131 relative to an axis of symmetry P of the robotic lawn mower 1, that is, the angle of inclination of the first right wheel 122 relative to the axis of symmetry P of the robotic lawn mower 1. Furthermore, the velocity settings of the first left wheel 121, the second left wheel 131, the first right wheel 122 and the second right wheel 132 may vary at different velocities of rotation of the robotic lawn mower 1. In addition, it should be noted that this embodiment only describes a tire velocity setting in an on-site rotation mode, and if the position of the instantaneous center is changed differently, the velocity setting relations of the tires are also changed. Since the velocity setting relations may be derived from the movement posture of the robotic lawn mower, details are not repeated herein.

In some embodiments, the controller 14 provides a respective traction force for each of the first left wheel 121, the second left wheel 131, the first right wheel 122 and the second right wheel 132 according to the different velocity settings of the first left wheel 121, the second left wheel 131, the first right wheel 122 and the second right wheel 132, so as to implement the velocity settings described above.

Referring to FIG. 3 again, during the on-site rotation of the robotic lawn mower 1, the traction force on the first left wheel 121 is represented by F2, and the traction force on the first right wheel 122 is represented by F1, wherein F2 is the same as and parallel to the travel direction of the robotic lawn mower 1. F1 is opposite F2. The traction force on the second left wheel 131 is represented by F3, and the traction force on the second right wheel 132 is represented by F4. F3 is the same as and parallel to the travel direction of the robotic lawn mower 1. F3 is opposite F4. The direction of rotation of the robotic lawn mower 1 is represented by M, and the instantaneous center of movement is represented by A and is located at the center A of a connecting line between the axle centers of the first left wheel 121 and the first right wheel 122. For example, a line connecting a right wheel center B point of the second right wheel 132 and the instantaneous center of velocity A is represented by C, a component force of F4 in a perpendicular direction to the connecting line C is represented by F4a, and a component force on the connecting line C is represented by F4b. Similarly, a connecting line between a left wheel center D of the second left wheel 131 and the instantaneous center of velocity A is represented by E, a component force of F3 in a perpendicular direction to the connecting line E is represented by F3a, and a component force on the connecting line E is represented by F3b. An included angle between the line C connecting the right wheel center B and the instantaneous center of velocity A and a perpendicular direction F to an axle of the second right wheel 132 is represented by β2. In this case, F4a=F4*sinβ2. Similarly, F3a may be calculated in a similar way. F3a enables the second left wheel 131 to overcome the resistance between the second left wheel and the ground that needs to be overcome when the second left wheel 131 rotates, and F4a enables the second right wheel 132 to overcome the resistance between the second right wheel and the ground that needs to be overcome when the second right wheel 132 rotates, such that the robotic lawn mower 1 can make a turn more smoothly.

Figure 5:
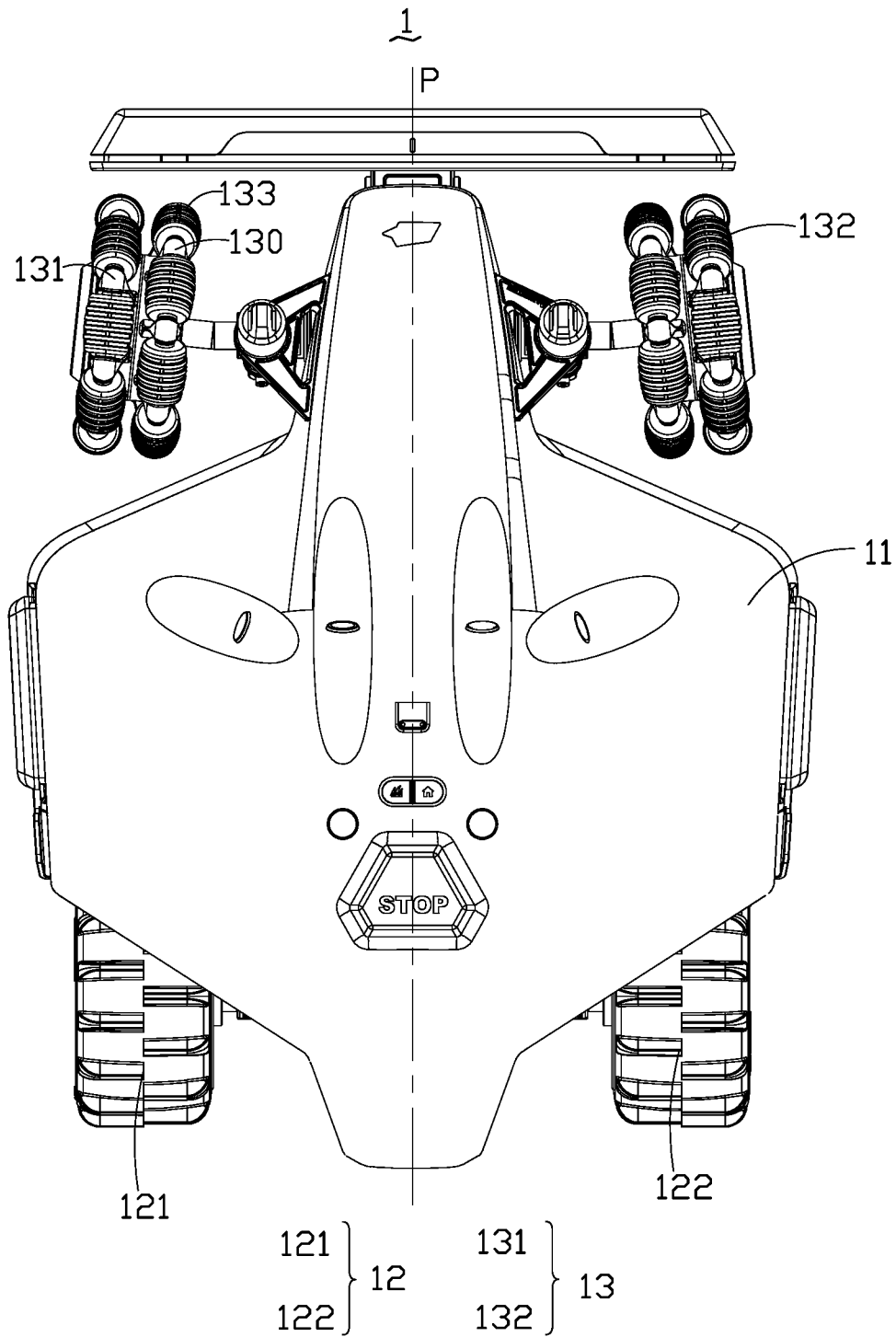
FIG. 5 is a schematic structural diagram of a robotic lawn mower according to a second embodiment of the present application.

Referring to FIG. 5, FIG. 5 is a schematic perspective structural diagram of a robotic lawn mower according to a second embodiment of the present application. The robotic lawn mower 1 of the second embodiment is structured similarly to the robotic lawn mower 1 of the first embodiment, except that the robotic lawn mower 1 of the second embodiment has an axis of symmetry P, the second wheel set 13 is arranged symmetrically with respect to the axis of symmetry P of the robotic lawn mower 1, and the second wheel set 13 is obliquely arranged with respect to the axis of symmetry P in the form of an inverted V. Specifically, the second wheel set 13 includes a second left wheel 131 and a second right wheel 132. The second left wheel 131 and the second right wheel 132 are arranged symmetrically and obliquely with respect to the axis of symmetry P and are arranged in the form of an inverted V. In FIG. 5, an included angle between the second left wheel 131 and the axis of symmetry P of the robotic lawn mower 1 is 6 degrees. An included angle between the second right wheel 132 and the axis of symmetry P of the robotic lawn mower 1 is 6 degrees. It may be understood that in other embodiments, the included angle may be different, such as 3 degrees, which is not limited herein.

Figure 6:
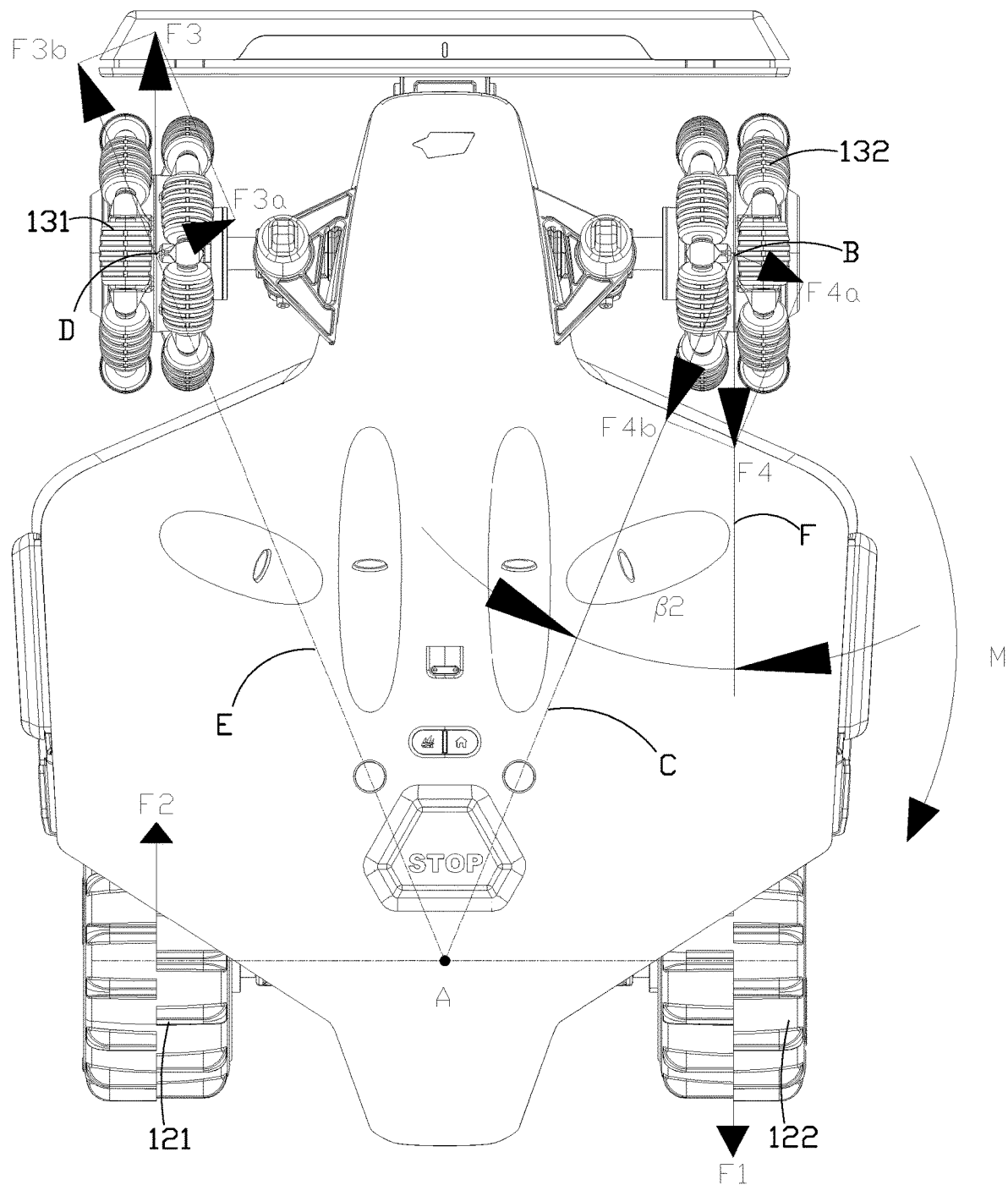
FIG. 6 is a schematic stress diagram of the robotic lawn mower according to the second embodiment of the present application during on-site clockwise rotation.
Figure 7:
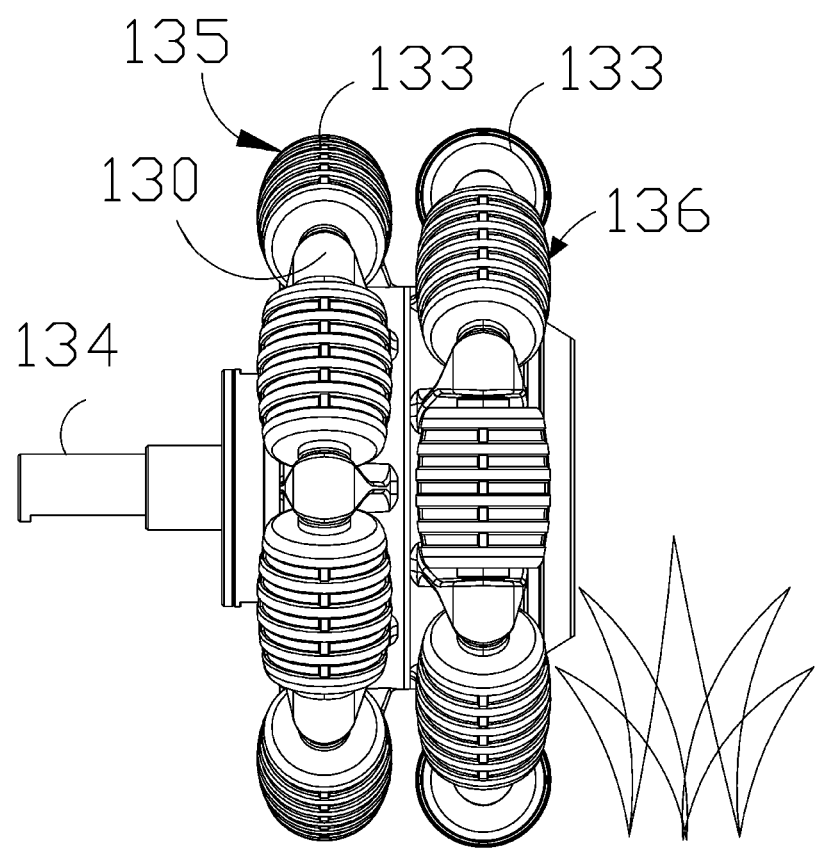
FIG. 7 is a schematic perspective structural diagram of an omni-directional wheel according to an embodiment of the present application.

Referring to FIG. 6, a line connecting a right wheel center point B of the second right wheel 132 and the instantaneous center of velocity A is represented by C, a component force of F4 in a perpendicular direction to the connecting line C is represented by F'4a, and a component force on the connecting line C is represented by F'4b. Similarly, a connecting line between a left wheel center D of the second left wheel 131 and the instantaneous center of velocity A is represented by E, a component force of F3 in a perpendicular direction to the connecting line E is represented by F'3a, and a component force on the connecting line E is represented by F'3b. An included angle between the connecting line C between the right wheel center B and the instantaneous center of velocity A and the perpendicular direction F to an axle of the second right wheel 132 is represented by β1. In this case, F'4a=F4*sinβ1. β1 is greater than β2. Similarly, F'3a may be calculated in a similar way. F'4a is greater than F4a. When the second right wheel 132 inclines relative to the axis of symmetry P of the robotic lawn mower 1, a component force of the traction force acting on the second left wheel 131 and the second right wheel 132 in the direction of rotation M is larger, and the friction force between the wheels and the ground is easier to overcome, such that the robotic lawn mower 1 can make a turn more smoothly. Furthermore, when the robotic lawn mower 1 travels in a straight line, since the second left wheel 131 and the second right wheel 132 are arranged relatively obliquely, a rotation component force is still provided to the auxiliary wheels 133, such that the auxiliary wheels 133 remain rotating. Referring to FIG. 7, as can be seen, if the second left wheel 131 and the second right wheel 132 are arranged in parallel to the axis of symmetry P, during on-site rotation, the grass in the direction of rotation M directly acts on side surfaces of the auxiliary wheels 133 and the hubs 130 (when the grass is higher than the auxiliary wheels 133) to generate a resistance. Therefore, when the second left wheel 131 and the second right wheel 132 are adjusted to be at an angle of inclination relative to the axis of symmetry P, it is conductive to reducing the resistance in the direction of rotation M to the second left wheel 131 and the second right wheel 132. That is, during on-site rotation of the robotic lawn mower 1, since the second left wheel 131 and the second right wheel 132 are arranged obliquely relative to the axis of symmetry P, the resistance of the grass acting on the side surfaces of the second left wheel 131 and the second right wheel 132 is reduced, and the rotation capacity of the robotic lawn mower 1 is improved.

Figure 8:
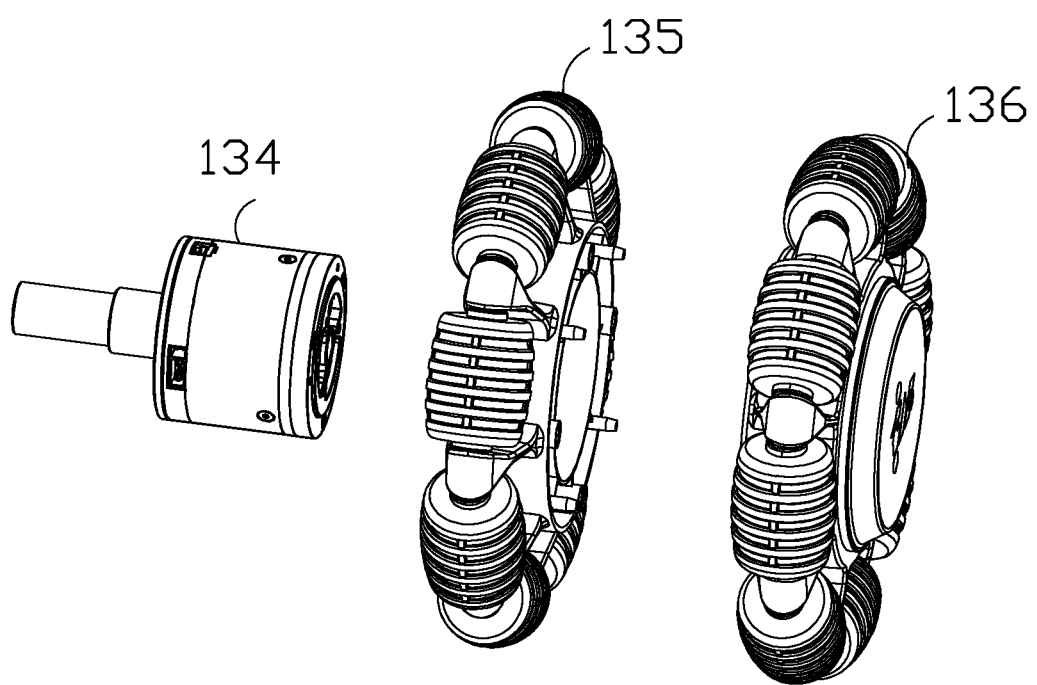
FIG. 8 is a schematic exploded diagram of the omni-directional wheel of FIG. 7.
Figure 9:
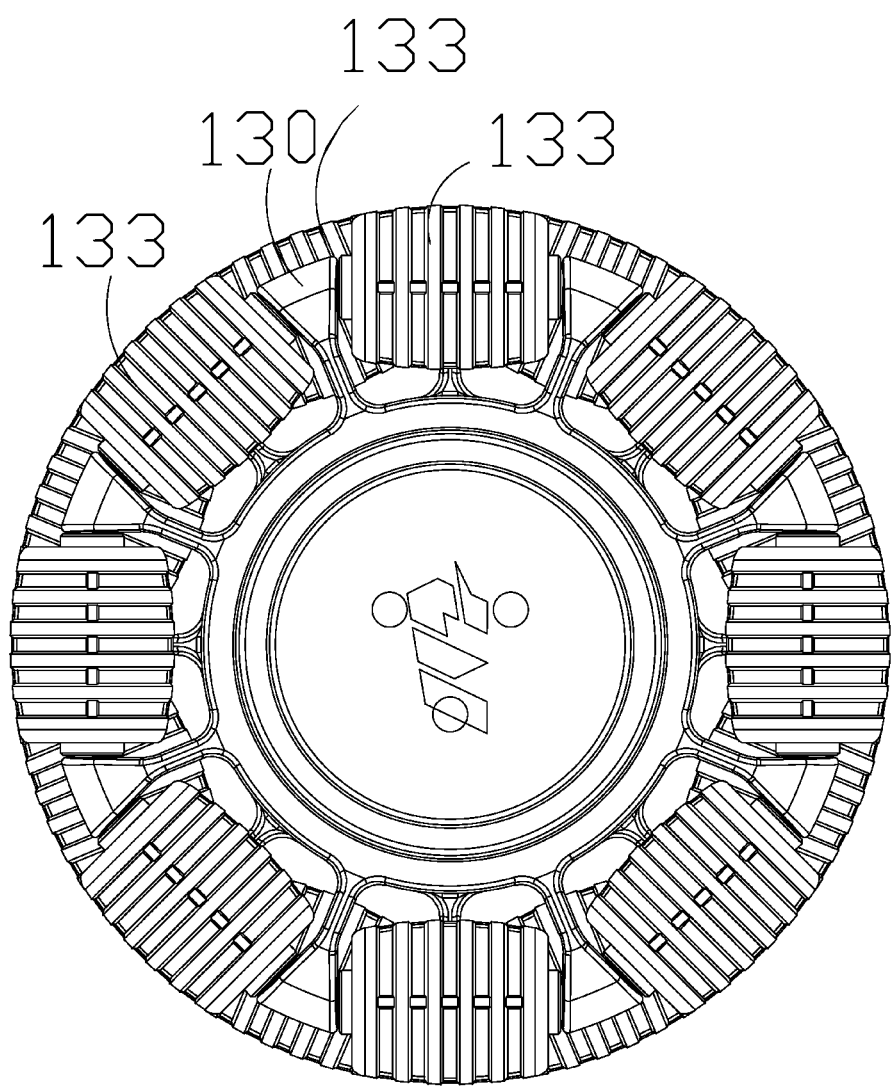
FIG. 9 is a side view of FIG. 7.

In some embodiments, referring to FIGS. 8 and 9, the second left wheel 131 is a coaxially arranged duplex wheel, and the second right wheel 132 is also a coaxially arranged duplex wheel.

Specifically, the duplex wheel includes an axle 134, a first wheel 135, and a second wheel 136. The axle 134 passes through the first wheel 135 and is the secured to the second wheel 136. The first wheel 135 and the second wheel 136 each include a hub 130 and a plurality of auxiliary wheels 133, and the plurality of auxiliary wheels 133 are strung on the hub 130 at intervals. The auxiliary wheels 133 of the first wheel 135 are staggered with the auxiliary wheels 133 of the second wheel 136, such that all the auxiliary wheels 133 form a complete circle in a perpendicular plane to an axis of the axle 134, which may improve the movement smoothness without unevenness during rotation. Furthermore, projections of the first wheel 135 and the second wheel 136 in the perpendicular plane to the axis of the axle 134 overlap partially with each other. When the duplex wheel rotates until the auxiliary wheels 133 of the first wheel 135 and the second wheel 136 simultaneously come into contact with the ground, compared with the case of a single auxiliary wheel 133 coming into contact with the ground, a unit pressure of the auxiliary wheels 133 of the ground may be reduced, thereby reducing damages to the lawn. Additionally, the rotation of the auxiliary wheels 133 is conductive to tossing away impurities in a gap between the auxiliary wheels 133 and the axle 134 thereof, and the operation flexibility is improved.

Figure 10:
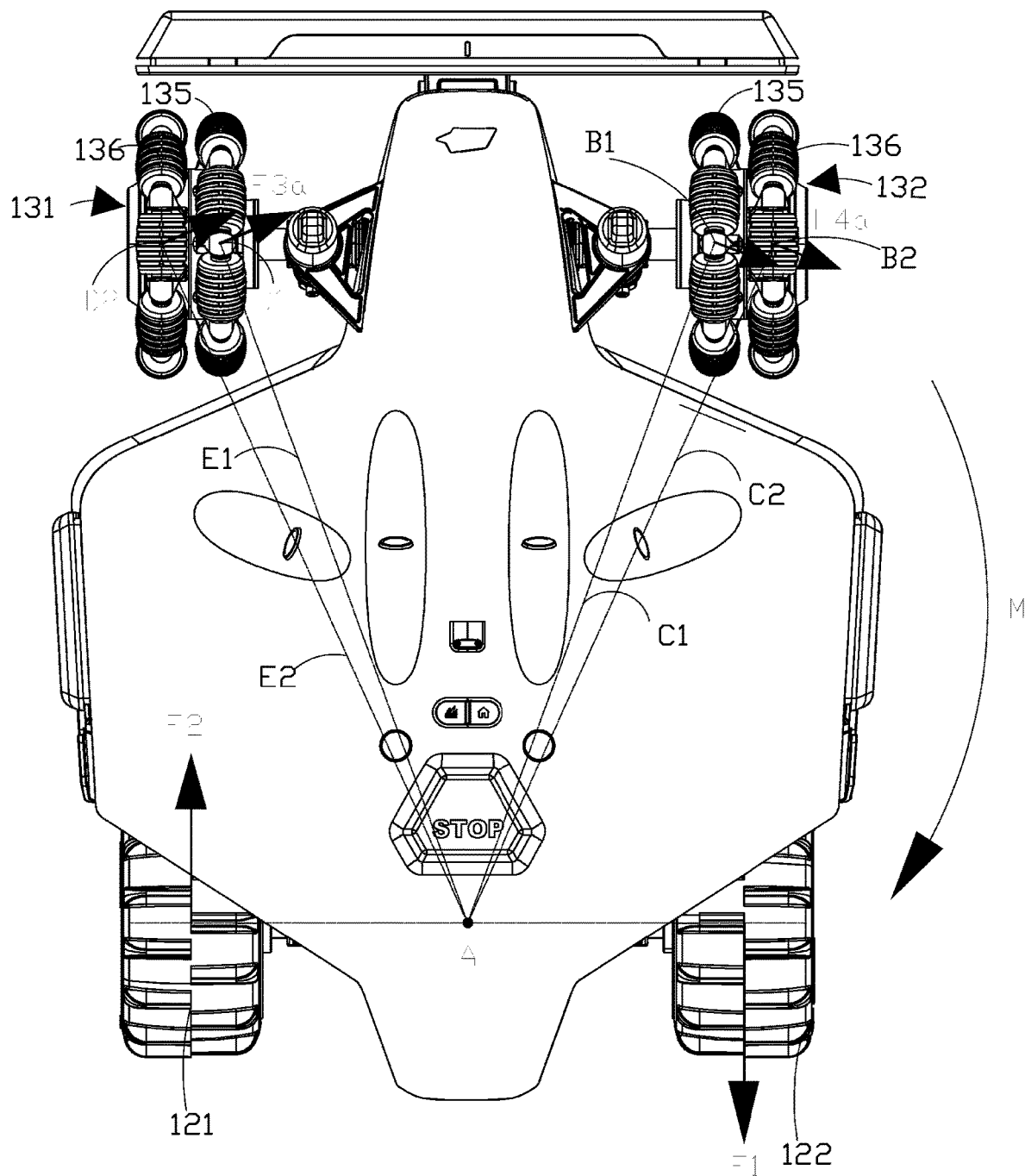
FIG. 10 is a schematic stress diagram of omni-directional wheels, which are duplex wheels, during on-site clockwise rotation according to an embodiment of the present application.

Referring to FIG. 10, FIG. 10 is a schematic stress diagram of a first wheel set, which is a duplex wheel, during on-site clockwise rotation according to an embodiment of the present application. The duplex wheel of the second left wheel 131 includes a first wheel 135 and a second wheel 136. The center of the first wheel 135 is a first wheel center D1, the center of the second wheel 136 is a second wheel center D2, a connecting line between the first wheel center D1 and the instantaneous center of velocity A is represented by E1, a connecting line between the second wheel center D2 and the instantaneous center of velocity A is represented by E2, and obviously, the length of E2 is greater than the length of E1. Therefore, in the case of the same torque, the moment at the second wheel center D2 is larger due to a longer arm of force of E2. Therefore, when the second left wheel 131 rotates until the auxiliary wheels 133 of the first wheel 135 come into contact with the ground, an arm of force E1 is provided, and when the second left wheel 131 rotates until the auxiliary wheels 133 of the second wheel 136 come into contact with the ground, an arm of force E2 is provided. Therefore, since the auxiliary wheels 133 of the first wheel 135 are staggered with the auxiliary wheels 133 of the second wheel 136, the arm of force of the second left wheel 131 alternately and periodically changes between E1 and E2. Even if the power and the velocity of rotation of the second left motor remain unchanged, the moment generated by the second left wheel 13 is different under the actions of different arm of forces. A static friction force that cannot be overcome when the auxiliary wheels 133 of the first wheel 135 come into contact with the ground may be overcome when the auxiliary wheels 133 of the second wheel 136 come into contact with the ground because of an increased moment, and is converted into a sliding friction force in a rotating path.

Similarly, the duplex wheel of the second right wheel 132 includes a first wheel 135 and a second wheel 136. The center of the first wheel 135 is a third wheel center B1, the center of the second wheel 136 is a fourth wheel center B2, a connecting line between the third wheel center B1 and the instantaneous center of velocity A is represented by C1, a connecting line between the fourth wheel center B2 and the instantaneous center of velocity A is represented by C2, and obviously, the length of C2 is greater than the length of C1. Therefore, in the case of the same torque, the moment of C2 is larger due to a longer arm of force of C2. Therefore, when the second right wheel 132 rotates until the auxiliary wheels 133 of the first wheel 135 come into contact with the ground, an arm of force C1 is provided, and when the second right wheel 132 rotates until the auxiliary wheels 133 of the second wheel 136 come into contact with the ground, an arm of force C2 is provided. Therefore, since the auxiliary wheels 133 of the first wheel 135 are staggered with the auxiliary wheels 133 of the second wheel 136, the arm of force of the second right wheel 132 alternately and periodically changes between C1 and C2. Even if the power and the velocity of rotation of the second right motor remain unchanged, the moment generated by the second right wheel 132 is different under the actions of different arm of forces. A static friction force that cannot be overcome when the auxiliary wheels 133 of the first wheel 135 come into contact with the ground may be overcome when the auxiliary wheels 133 of the second wheel 136 come into contact with the ground because of an increased moment, and is converted into a sliding friction force in a rotating path.

In this embodiment, referring to FIG. 1, the first wheel set 12 is arranged at the rear end of the frame 11, and the second wheel set 13 is arranged at the front end of the frame 11. That is to say, the robotic lawn mower 1 is driven by the rear wheels, and the front wheels are omni-directional wheels.

In other embodiments, the first wheel set 12 is arranged at the front end of the frame 11, and the second wheel set 13 is arranged at the rear end of the frame 11. That is to say, the robotic lawn mower 1 is driven by the front wheels, and the rear wheels are omni-directional wheels.

Therefore, in the present application, no matter whether the front wheels serve as driving wheels or the rear wheels serve as driving wheels, the robotic lawn mower may more easily make a turn without lawn wear, and the device cost and energy consumption may also be reduced.

It should be noted that those skilled in the art should also appreciate that all the embodiments described in the specification are optional embodiments, and the involved actions and modules are not necessarily mandatory to the present application. The controller may be a general-purpose processor, a digital signal processor, an application-specific integrated circuit, a field programmable gate array or other programmable logic devices, a discrete gate or a transistor logic device, or a discrete hardware component.

The foregoing descriptions are merely preferred embodiments of the present application. It should be noted that several alterations and improvements can also be made by a person of ordinary skill in the art without departing from the spirit of the present application, and these all fall within the scope of protection of the present application.

What is claimed:

1. A robotic lawn mower, comprising a frame, a first wheel set, and a second wheel set, wherein the first wheel set and the second wheel set are respectively arranged at two opposite ends of the frame, wherein the two opposite ends are rear and front ends, the first wheel set is equipped with driving wheels, and the second wheel set is equipped with omni-directional wheels; and in that the robotic lawn mower further comprises a controller, a first driving module, and a second driving module, wherein the controller is connected to each of the first driving module and the second driving module, the controller controls the first driving module to drive the first wheel set to move so as to provide a first power to the robotic lawn mower, and the controller further controls the second driving module to drive the second wheel set to rotate so as to provide a second power for overcoming a resistance generated by the ground when the second wheel set rotates relative to the ground; when the robotic lawn mower rotates on site, an instantaneous center of velocity of the robotic lawn mower is proximate to a midpoint of a line connecting axle centers of the driving wheels in the first wheel set; wherein the second wheel set is arranged symmetrically and obliquely with respect to an axis of symmetry of the robotic lawn mower in a splayed manner.

2. The robotic lawn mower according to claim 1, wherein the omni-directional wheels are continuous switching wheels or Mecanum wheels.

3. The robotic lawn mower according to claim 1, wherein the first wheel set is arranged at the rear end of the frame, and the second wheel set is arranged at the front end of the frame.

4. The robotic lawn mower according to claim 1, wherein the first wheel set is arranged at the front end of the frame, and the second wheel set is arranged at the rear end of the frame.

5. The robotic lawn mower according to claim 1, wherein a moment provided to the second wheel set by the second driving module is less than a moment provided to the first wheel set by the first driving module.

6. The robotic lawn mower according to claim 5, wherein the moment provided to the second wheel set by the second driving module varies depending on the magnitude of the resistance generated by the ground when the second wheel set rotates relative to the ground, and driving power provided to the second wheel set by the second driving module is always greater than the resistance generated by the ground to the second wheel set when the second wheel set rotates.

7. The robotic lawn mower according to claim 5, wherein the robotic lawn mower comprises an angle sensor connected to the controller; and the angle sensor, when sensing that the robotic lawn mower makes a turn, generates a turning signal, and the controller controls, on the basis of the turning signal, the second driving module to start to operate, and adjusts the moment provided to the second wheel set by the second driving module based on the magnitude of the resistance generated by the ground to the second wheel set when the second wheel set rotates.

8. A robotic lawn mower, comprising a frame, a first wheel set, and a second wheel set, wherein the first wheel set and the second wheel set are respectively arranged at two opposite ends of the frame, the two opposite ends are rear and front ends, the first wheel set is equipped with driving wheels, and the second wheel set is equipped with omni-directional wheels; and in that the robotic lawn mower further comprises a controller, a first driving module, and a second driving module, wherein the controller is connected to each of the first driving module and the second driving module, the controller controls the first driving module to drive the first wheel set to move so as to provide main power to the robotic lawn mower, and the controller further controls the second driving module to drive the second wheel set to rotate so as to provide auxiliary power for overcoming a resistance generated by the ground when the second wheel set rotates relative to the ground; when the robotic lawn mower rotates on site, an instantaneous center of velocity of the robotic lawn mower is proximate to a midpoint of a line connecting axle centers of the driving wheels in the first wheel set; the first wheel set comprises a first left wheel and a first right wheel, and the first driving module comprises a first left motor for driving the first left wheel and a first right motor for driving the first right wheel; the second wheel set comprises a second left wheel and a second right wheel, and the second driving module comprises a second left motor for driving the second left wheel and a second right motor for driving the second right wheel; and when the robotic lawn mower rotates, a traction force provided to the second left wheel by the second left motor is a first traction force, a traction force provided to the second right wheel by the second right motor is a second traction force, and the first traction force is opposite the second traction force, wherein a component force of the first traction force in a perpendicular direction to a connecting line between the instantaneous center of velocity of the robotic lawn mower and a tire center of the second left wheel is a first traction component force, a component force of the second traction force in a perpendicular direction to a connecting line between the instantaneous center of velocity of the robotic lawn mower and a tire center of the second right wheel is a second traction component force, and the first traction component force and the second traction component force respectively enable the second left wheel and the second right wheel to overcome the resistances generated by the ground when the second left wheel and the second right wheel rotate;

wherein the larger an included angle between the connecting line, which is connecting the instantaneous center of velocity of the robotic lawn mower and the tire center of the second left wheel, and a perpendicular direction to an axle of the second left wheel is, the larger the first traction component force is; and the larger an included angle between the connecting line, which is connecting the instantaneous center of velocity of the robotic lawn mower and the tire center of the second right wheel, and a perpendicular direction to an axle of the second right wheel is, the larger the second traction component force is.

9. A robotic lawn mower, comprising a frame, a first wheel set, and a second wheel set, wherein the first wheel set and the second wheel set are respectively arranged at two opposite ends of the frame, the two opposite ends are rear and front ends, the first wheel set is equipped with driving wheels, and the second wheel set is equipped with omnidirectional wheels; and in that the robotic lawn mower further comprises a controller, a first driving module, and a second driving module, wherein the controller is connected to each of the first driving module and the second driving module, the controller controls the first driving module to drive the first wheel set to move so as to provide main power to the robotic lawn mower, and the controller further controls the second driving module to drive the second wheel set to rotate so as to provide auxiliary power for overcoming a resistance generated by the ground when the second wheel set rotates relative to the ground; when the robotic lawn mower rotates on site, an instantaneous center of velocity of the robotic lawn mower is proximate to a midpoint of a line connecting axle centers of the driving wheels in the first wheel set; the first wheel set comprises a first left wheel and a first right wheel, and the first driving module comprises a first left motor for driving the first left wheel and a first right motor for driving the first right wheel; the second wheel set comprises a second left wheel and a second right wheel, and the second driving module comprises a second left motor for driving the second left wheel and a second right motor for driving the second right wheel; and when the robotic lawn mower rotates, a traction force provided to the second left wheel by the second left motor is a first traction force, a traction force provided to the second right wheel by the second right motor is a second traction force, and the first traction force is opposite the second traction force, wherein a component force of the first traction force in a perpendicular direction to a connecting line between the instantaneous center of velocity of the robotic lawn mower and a tire center of the second left wheel is a first traction component force, a component force of the second traction force in a perpendicular direction to a connecting line between the instantaneous center of velocity of the robotic lawn mower and a tire center of the second right wheel is a second traction component force, and the first traction component force and the second traction component force respectively enable the second left wheel and the second right wheel to overcome the resistances generated by the ground when the second left wheel and the second right wheel rotate;

wherein the second left wheel is a coaxially-arranged duplex wheel, and the second right wheel is a coaxially-arranged duplex wheel; the duplex wheel comprises an axle, a first wheel, and a second wheel, the axle connects the first wheel and the second wheel, and the first wheel and the second wheel each comprise a hub and a plurality of auxiliary wheels, the plurality of auxiliary wheels are strung on the hub at intervals.

10. The robotic lawn mower according to claim 9, wherein the auxiliary wheels of the first wheel are staggered with the auxiliary wheels of the second wheel, such that all the auxiliary wheels form a complete circle in a perpendicular plane to an axis of the axle.

* * * * *